US011822696B2

(12) United States Patent
Ogihara et al.

(10) Patent No.: US 11,822,696 B2
(45) Date of Patent: Nov. 21, 2023

(54) DYNAMIC ENVIRONMENTAL CONTROL

(71) Applicant: International Business Machines Corporation, Armonk, NY (US)

(72) Inventors: Hiroya Ogihara, Kamiasao (JP); Sanehiro Furuichi, Setagaya-ku (JP); Daisuke Maruyama, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 17/001,727

(22) Filed: Aug. 25, 2020

(65) Prior Publication Data

US 2022/0067198 A1 Mar. 3, 2022

(51) Int. Cl.
*G06F 21/62* (2013.01)
*G06F 16/22* (2019.01)
(Continued)

(52) U.S. Cl.
CPC ........ *G06F 21/6254* (2013.01); *G06F 16/22* (2019.01); *G06F 16/245* (2019.01);
(Continued)

(58) Field of Classification Search
CPC .... G06F 21/6254; G06F 16/22; G06F 16/245; G06F 16/258; G06F 21/6227;
(Continued)

(56) References Cited

U.S. PATENT DOCUMENTS

| 10,936,744 B1* | 3/2021 | Trepetin | H04L 9/0861 |
| 2015/0213226 A1* | 7/2015 | Wolniewicz | G16Z 99/00 |
| | | | 705/3 |

(Continued)

FOREIGN PATENT DOCUMENTS

| JP | 2013128649 A | 7/2013 |
| JP | 2016007363 A | 1/2016 |

(Continued)

OTHER PUBLICATIONS

Mell et al., "The NIST Definition of Cloud Computing", National Institute of Standards and Technology, Special Publication 800-145, Sep. 2011, 7 pages.

*Primary Examiner* — Amie C. Lin
*Assistant Examiner* — Carlton Johnson
(74) *Attorney, Agent, or Firm* — Stephen R. Yoder

(57) ABSTRACT

Computer-implemented methods, systems and computer program products leveraging collection and analysis of anonymized biological data, location data, individual IDs and time data from groups of individuals within a surrounding environment. The anonymized data can be combined with sources of map data and available historical data to help provide context about the surrounding environment of the users and stored for analysis and decision-making that physically impacts and alters the surrounding environment. At periodic or sporadic intervals, the collected data is extracted and analyzed. Based on the analysis of the anonymized data, physical changes are dynamically implemented within the physical environment, including remotely altering the physical environment by instructing changes to surrounding environment over a computer network such as modifying one or more settings of IoT devices positioned within the surrounding environment analyzed.

19 Claims, 7 Drawing Sheets

(51) Int. Cl.
  *G06F 16/25* (2019.01)
  *G06F 16/245* (2019.01)
  *H04L 67/12* (2022.01)
  *G16Y 30/00* (2020.01)
  *G16Y 10/75* (2020.01)
  *G16Y 20/40* (2020.01)

(52) U.S. Cl.
  CPC ........ *G06F 16/258* (2019.01); *G06F 21/6227* (2013.01); *G16Y 10/75* (2020.01); *G16Y 20/40* (2020.01); *G16Y 30/00* (2020.01); *H04L 67/12* (2013.01)

(58) Field of Classification Search
  CPC ..... G06F 2221/2111; G06F 2221/2129; G16Y 10/75; G16Y 20/40; G16Y 30/00; H04L 67/12; H04L 67/52; H04L 67/535
  See application file for complete search history.

(56) References Cited

U.S. PATENT DOCUMENTS

| | | | | |
|---|---|---|---|---|
| 2016/0019780 A1* | 1/2016 | Gettings | ................ | G08C 17/02 |
| | | | | 342/357.29 |
| 2016/0269473 A1* | 9/2016 | Bhogal | ................ | H04L 67/535 |
| 2018/0131740 A1* | 5/2018 | Ramamurthy | ...... | G06F 21/6254 |
| 2019/0079481 A1 | 3/2019 | Gluck | | |

FOREIGN PATENT DOCUMENTS

| | | | |
|---|---|---|---|
| JP | 2016095653 A | 5/2016 |
| JP | 2017062060 A | 3/2017 |
| WO | 2016186327 A1 | 11/2016 |
| WO | 2018179289 A1 | 10/2018 |
| WO | 2019049356 A1 | 3/2019 |

\* cited by examiner

DYNAMIC ENVIRONMENTAL CONTROL

TECHNICAL FIELD

The present disclosure relates generally to the fields of data collection, data anonymization and analytics, and more specifically modifying and controlling physical environments based on analysis of collected anonymized data.

BACKGROUND

Data anonymization is the use of one or more techniques designed to make it impossible or at the very least difficult to identify a particular person or personal identifying information related to a person from a data value. Data anonymization seeks to protect private or sensitive data by deleting or encrypting personally identifiable information from a database. Data anonymization methods include encryption, hashing, generalization, pseudonymization, and perturbation. Data anonymization can be done for the purpose of protecting an individual's or company's private activities while maintaining the integrity of the data being gathered and shared. Data anonymization techniques seek to conceal the identity and identifiers that can be applied to a person. Personal identifying information may include family names, first names, maiden names, aliases, addresses, phone numbers, ID numbers, social security numbers, credit card info, etc. Data anonymization is also known as "data obfuscation," "data masking," or "data de-identification."

The Internet-of-Things is a system of interrelated computing devices, mechanical or digital machines, objects, animals and/or people that are provided with unique identifiers (UIDs). IoT networks allow for the ability to transfer data over computer networks without requiring human-to-human or human-to-computer interaction. The device or object (i.e., the "thing") in the internet of things, can be a person with a heart monitor implant, animals with a microchip implant or transponder, home appliances, lightbulbs, an automobile with built-in sensors and/or any natural or man-made object that can be assigned an IP address and can be capable of transferring data over a computer network.

An IoT ecosystem can comprise internet-enabled devices that use embedded processors and communication hardware to collect, send and act on data acquired from the IoT device's surrounding environment. IoT devices can share the data they collect by connecting to an IoT gateway or other edge devices. The collected data can be sent to a cloud computing environment or analyzed by locally operating computer systems. IoT devices can communicate with one another or other related devices on the computer network. The connectivity, networking and communication protocols used, can allow for the IoT devices to interact without much, if any human interaction, and be used to monitor business processes, improve user experiences, enhance employee productivity, influence business decisions and integrate or adapt business models.

SUMMARY

Embodiments of the present disclosure relate to a computer-implemented method, an associated computer system and computer program product for dynamically controlling a surrounding environment based on anonymized data collected from devices positioned within the surrounding environment. The computer-implemented method comprising: instructing, by a processor, a collection of data comprising biological data, location data, individual IDs and time data from a plurality of client devices; identifying, by the processor, as a function of the location data collected, map data and historical entry/exit data, a surrounding physical environment for each of the plurality of client devices corresponding to a time the location data is collected; converting, by the processor, the collection of data into anonymous data at an anonymization level established by a set of collection conditions at the time of the collection of the data; storing, by the processor, the anonymous data in a database; periodically extracting, by the processor, a portion of the anonymous data associated with the surrounding physical environment from the database; analyzing, by the processor, the portion of the anonymous data associated with the surrounding physical environment; and as a function of analyzing the portion of anonymous data associated with the surrounding physical environment, applying, by the processor, a modification to an environmental control of the surrounding physical environment.

BRIEF DESCRIPTION OF THE DRAWINGS

FIG. 5b is a continuation of the method steps describing the embodiment of the method from FIG. 5a.

DETAILED DESCRIPTION

Figure 1:
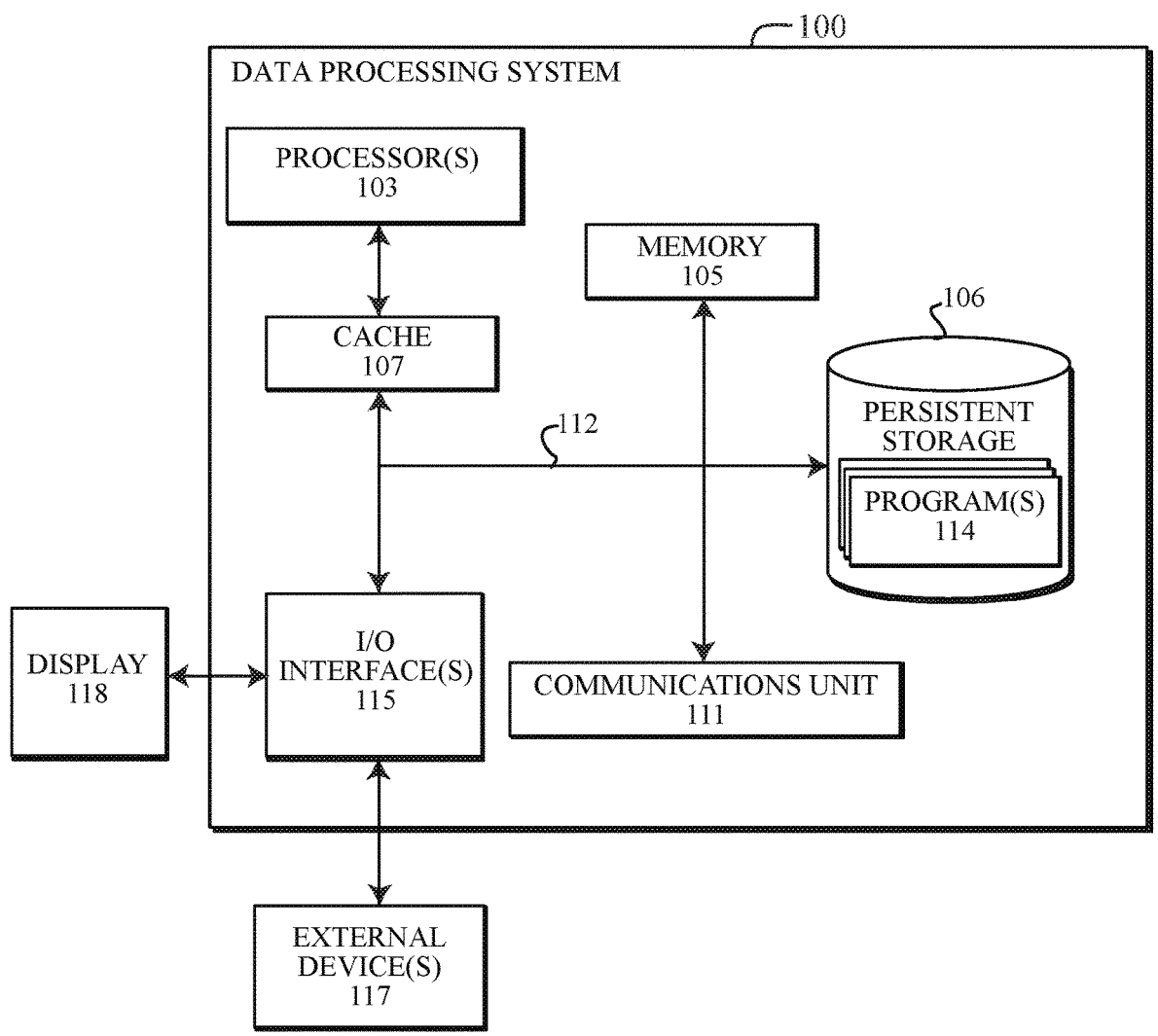
FIG. 1 depicts an embodiment of a block diagram of internal and external components of a data processing system, in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Currently available technology and data collection techniques can be configured to use biological information and biological data describing individuals in order to optimize the health of an individual, identify conditions that are stressful to individuals within an environment and/or gauge the emotional excitement or sentiment of individuals or groups. Some technologies and techniques can be used to modify the surrounding environment in order to alleviate conditions identified using an individual's collected biological data. For example, detecting stress levels in an individual and modifying the surrounding environment to relieve the stress. For instance, by optimizing the sounds or lighting of the environment in order to reduce an individual's stress and instill a comfortable, relaxing environment.

Embodiments of the present disclosure recognize the inability of currently available technology and techniques to control or optimize a surrounding environment for an entire group or mass of many individuals, based on a collection of biological data from all, or a portion of the mass of individuals within the particular environment or location. The term "biological data" may refer to data values that describe one or more physiological attributes or demographics associated with an individual. For example, biological data can describe an individual's age, gender, weight, income level, education level, heart rate, pulse rate, sweat level, respiration rate, physical activity level, blood sugar level, body temperature, blood pressure, etc. Embodiments of the present disclosure leverage the use of biological data collection, location data (such as GPS location), data anonymization, and data analytics to analyze collections of data received from a mass of individuals present within a surrounding environment and utilize the collection of anonymized data to control and/or modify the surrounding environment in a manner consistent with the analysis of the anonymized data collected. Embodiments of the present disclosure may further leverage networks of IoT devices positioned within the surrounding environment and modify one or more settings of the IoT devices to physically change one or more attributes of the surrounding environment to the benefit of the mass of individuals positioned therein.

Embodiments of the present disclosure may collect, and aggregate numerous types of available data provided by one or more devices associated with users within a surrounding environment. For example, collection of biological information, positional information, identification information about the individuals providing the collected data ("individual IDs") or device information ("device IDs"), time-series data or metadata at the time of data collection and other data that may be provided, from the plurality of individuals participating to provide the collected data. Sources of the collected data may be a computing device capable of collecting, storing and/or transmitting data collected about the user. For example, the devices used to collect data about individuals may include mobile communication devices such as smartphones, smartwatches, smart glasses, wearable IoT devices, wearable sensors or sensors positioned within an environment (as a standalone devices or integrated into a device), AI-enabled smart hubs, proprietary computing devices and other computing devices known or used by a person skilled in the art.

Individuals providing the collected data may opt-in to the data collection procedures and/or specify one or more conditions or settings wherein the individuals' consent to the collection of data. For example, specifying the types of data consented to be collected and the level of anonymization required by the individual in order for the data to be collected from an individual's device. In some embodiments, individuals may receive a notification describing the data collection at the time of the collection request, including a description of the types of data that may be collected and a level of anonymization that may be applied to the data to ensure anonymity of the individual user. Individuals receiving the data collection request and notification can accept or deny the request to collect data stored by the individual's device(s), propose changes to the data collection request to include only specific types of data and/or specify an increased level of anonymization to apply to the data collected. In some embodiments, individuals who opt-in to the data collection may be eligible to receive discounts, fee reductions or other perks that may pertain to the surrounding physical environment in exchange for the data provided by the individual's device(s). For example, if the surrounding environment is public transportation such as a train or subway, individuals consenting to the collection of data within the surrounding area of the train or subway station may receive discount tickets or reduced fees.

Embodiments of the present disclosure can perform data collection in a variety of different manners. For example, in some embodiments, the devices of the individual receiving data collection requests may transmit the requested data directly to a data collection server where the collected data may be anonymized and subsequently stored for extraction and further analysis at a future point in time. In alternative embodiments, the anonymization of the data can be performed by the individual device transmitting the collected data prior to the transmission of the data to a data collection server. In another alternative embodiment, the data anonymized by the individual devices storing the data before being shared with nearby devices participating in the collection of data. For example, the anonymized data can be transmitted between the devices within the surrounding environment and whereupon a predetermined amount of data is collected, one or more representative devices within the surrounding environment receiving the anonymized data from the surrounding devices may transmit the collected anonymized data to a data collection server once the threshold amount of data is collected. By transmitting anonymized data between individual devices, rather than all devices transmitting data to a data collection server, data collection can occur without all devices having to be able to connect to a mobile network or servers. For example, device to device transmission of anonymized data can be performed using short-range communication signals such as Bluetooth, Wi-Fi, WLAN, ZigBee, NFC, etc.

Embodiments of the present disclosure may identify the location of the physical surroundings where the data collection occurs using a combination of location data collected from each individual's devices in conjunction with map data stored by one or more data sources. Using the combination of location data, for example, GPS or cellular triangulation, and map data from an accessible data source, embodiments of the present disclosure can more precisely identify a particular physical surrounding such as a particular building, floor, room, vehicle, etc. In some instances, embodiments of the present disclosure may further identify a surrounding physical environment from which the collected data is associated with, using a correlation between individual IDs and historical data, such as entry/exit data tracking or logging use of the individual ID. For example, entry/exit data for badges, ID cards, key fabs and passes that may include access credentials for entering and/or exiting one or more locations. Embodiments of the present disclosure may cross-reference the individual IDs collected during data collection with historical data, such as the entry/exit data to confirm an individual's surrounding location at the time of data collection. For instance, corresponding location data and an entry log for an individual ID scanned by badge reader to confirm an individual has entered a particular building or location.

Embodiments of the anonymized data collected from individual devices, including biological data, location data, the identification of surrounding physical environment and time data can be stored to storage database or other types of data repositories. Periodically, such as at specified intervals of time and/or sporadically at random intervals of time, analysis of the collected data for a particular location may be performed. Embodiments of the present disclosure may extract one or more records of the collected data stored in the storage database for analysis associated with a particular location or physical environment. The analysis may determine one or more changes or modifications to implement within the physical environment associated with the collected data being analyzed. As a result of the analysis, instructions may be sent to one or more devices, systems and/or environmental controls within the physical environment that is analyzed using the collected data from the mass of individuals. As a result of the analysis, instructions to change the physical environment, the physical environment may be altered in a manner decided upon by the analysis. For example, embodiments of the present disclosure can determine that a particular physical environment such as an office building or a train is uncomfortably hot based on the analysis of the anonymized data collected. Embodiments of the present disclosure may modify settings within the office building or train to alleviate the heat, such as by instructing IoT-enabled thermostats to lower the temperature, switching on a remotely accessible air conditioning units, increasing fan speeds and/or remotely opening windows alleviate the built-up heat within the building or train.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 100, which may be a simplified example of a computing system capable of performing one or more computing operations described herein. Data processing system 100 may be representative of the one or more computing systems or devices depicted in the computing environment 200, 260, 300 as shown in FIGS. 2a-4, and in accordance with the embodiments of the present disclosure described herein. It should be appreciated that FIG. 1 provides only an illustration of one implementation of a data processing system 100 and does not imply any limitations with regard to the environments in which different embodiments may be implemented. In general, the components illustrated in FIG. 1 may be representative of any electronic device capable of executing machine-readable program instructions.

While FIG. 1 shows one example of a data processing system 100, a data processing system 100 may take many different forms, both real and virtualized. For example, data processing system 100 can take the form of personal desktop computer systems, laptops, notebooks, tablets, servers, client devices 201a to 201n (referred to generally as "client devices 201"), network devices, network terminals, thin clients, thick clients, kiosks, mobile communication devices (e.g., smartphones), augmented reality (AR) devices, virtual reality (VR) headsets, multiprocessor systems, microprocessor-based systems, minicomputer systems, mainframe computer systems, smart devices (i.e. smart glasses, smartwatches, etc.), or Internet-of-Things (IoT) devices 217a to 217n (referred to generally as "IoT devices 217"). The data processing systems 100 can operate in a networked computing environment, containerized computing environment, a distributed cloud computing environment, a serverless computing environment, and/or a combination of environments thereof, which can include any of the systems or devices described herein and/or additional computing devices or systems known or used by a person of ordinary skill in the art.

Data processing system 100 may include communications fabric 112, which can provide for electronic communications between one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103, memory 105, cache 107, external devices 117, and any other hardware components within a data processing system 100. For example, communications fabric 112 can be implemented as one or more buses.

Memory 105 and persistent storage 106 may be computer-readable storage media. Embodiments of memory 105 may include random access memory (RAM) and cache 107 memory. In general, memory 105 can include any suitable volatile or non-volatile computer-readable storage media and may comprise firmware or other software programmed into the memory 105. Software program(s) 114, applications, and services described herein may be stored in memory 105, cache 107 and/or persistent storage 106 for execution and/or access by one or more of the respective processor(s) 103 of the data processing system 100.

Persistent storage 106 may include a plurality of magnetic hard disk drives. Alternatively, or in addition to magnetic hard disk drives, persistent storage 106 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between data processing systems 100. For example, between one or more computer systems or devices via a communication network. In the exemplary embodiment, communications unit 111 may include network adapters or interfaces such as a TCP/IP adapter cards, wireless Wi-Fi interface cards or antenna, 3G, 4G, or 5G cellular network interface cards or other wired or wireless communication links. Communication networks can comprise, for example, copper wires, optical fibers, wireless transmission, routers, firewalls, switches, gateway computers, edge servers and/or other network hardware which may be part of, or connect to, nodes of the communication networks' devices, systems, hosts, terminals or other network computer systems. Software and data used to practice embodiments of the present invention can be downloaded to the computer systems operating in a network environment through communications unit 111 (e.g., via the Internet, a local area network or other wide area networks). From communications unit 111, the software and the data of program(s) 114, applications or services can be loaded into persistent storage 106 or stored within memory 105 and/or cache 107.

One or more I/O interfaces 115 may allow for input and output of data with other devices that may be connected to the data processing system 100. For example, I/O interface 115 can provide a connection to one or more external devices 117 such as one or more, IoT devices 217, recording devices such as an audio recording devices, microphones, cameras, one or more sensors 27, input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display device 118. Display device 118 provides a mechanism to display data to a user and can be, for example, a computer monitor, screen, television, projector, display panel, etc. Display devices 118 can also be an incorporated display and may function as a touch screen as part of a built-in display of a tablet computer or mobile computing device.

System for Dynamically Controlling a Physical Environment Using Collected and Anonymized Biological Information Referring to the drawings, FIGS. 2a-4 depict an approach that can be executed using one or more data processing systems 100 operating within a computing environment 200, 260, 300, and variations thereof, to implement systems, methods, and computer program products for dynamically controlling and managing environmental conditions within a physical environment 202 based upon analysis of biological information and other types of data collected and described herein, from one or more client devices 201 positioned within the physical environment 202. Embodiments of computing environments 200, 260, 300 may include one or more data processing systems 100 interconnected via a device network 250. The data processing systems 100 connected to the device network 250 may be specialized systems or devices that may include, but are not limited to, the interconnection of one or more client devices 201, IoT devices 217, servers 210, 220 and host systems or data centers maintaining one or more repositories, databases or other data sources. The data processing systems 100 exemplified in FIGS. 2a-4 may not only comprise the elements of the systems and devices depicted in the drawings of FIGS. 2a-4, but the specialized data processing systems depicted in FIG. 2a-4 may further incorporate one or more elements of a data processing system 100 shown in FIG. 1 and described above. Although not shown in the figures, one or more elements of the data processing system 100 may be integrated into the embodiments of client devices 201, IoT devices 217, data collection server 210, data analysis server 220, and host systems maintaining the entry/exit history 227 database, mapping data repository 229, bio-information storage database 231 and/or other data sources, including (but not limited to) the integration of one or more processor(s) 103, program(s) 114, memory 105, persistent storage 106, cache 107, communications unit 111, input/output (I/O) interface(s) 115, external device(s) 117 and display device 118.

Embodiments of the client devices 201, IoT devices 217, servers 210, 220 and host systems or data centers maintaining one or more repositories, databases or other data sources may be placed into communication with one another via a computer network 250. Embodiments of network 250 may be constructed using wired, wireless or fiber-optic connections. Embodiments of the client devices 201, IoT devices 217, servers 210, 220 and host systems or data centers maintaining one or more repositories, databases or other data sources may connect and communicate over the network 250 via a communications unit 111, such as a network interface controller, network interface card, network transmitter/receiver or other network communication device capable of facilitating communication within network 250. In some embodiments of computing environments 200, 260, 300, one or more client devices 201, servers 210, 220, IoT devices 217 or host systems maintaining bio-information database 231, entry/exit history 227 and/or mapping data repository 229, may represent data processing systems 100 utilizing clustered computers and components acting as a single pool of seamless resources when accessed through network 250. For example, such embodiments can be used in a datacenter, cloud computing network, storage area network (SAN), and network-attached storage (NAS) applications.

Embodiments of the communications unit 111 such as the network transmitter/receiver may implement specialized electronic circuitry, allowing for communication using a specific physical layer and a data link layer standard. For example, Ethernet, Fiber channel, Wi-Fi or other wireless radio transmission signals, cellular transmissions or Token Ring to transmit data between client devices 201, IoT devices 217, servers 210, 220 and host systems or data centers maintaining one or more repositories, databases or other data sources connected to network 250. Communications unit 111 may further allow for a full network protocol stack, enabling communication over network 250 to groups of client devices 201, IoT devices 217 forming an IoT network 215, a data collection server 210, data analysis server 220 and other data processing systems 100 linked together through communication channels of network 250. Network 250 may facilitate communication and resource sharing among client devices 201, IoT devices 217, servers 210, 220 and host systems or data centers maintaining one or more repositories, databases or other data sources connected to the network 250. Examples of network 250 may include a local area network (LAN), home area network (HAN), wide area network (WAN), backbone networks (BBN), peer to peer networks (P2P), campus networks, enterprise networks, the Internet, cloud computing networks, wireless communication networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, smart devices, IoT devices, virtual assistant hubs, etc.).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 250 of interconnected nodes 310.

Figure 3:
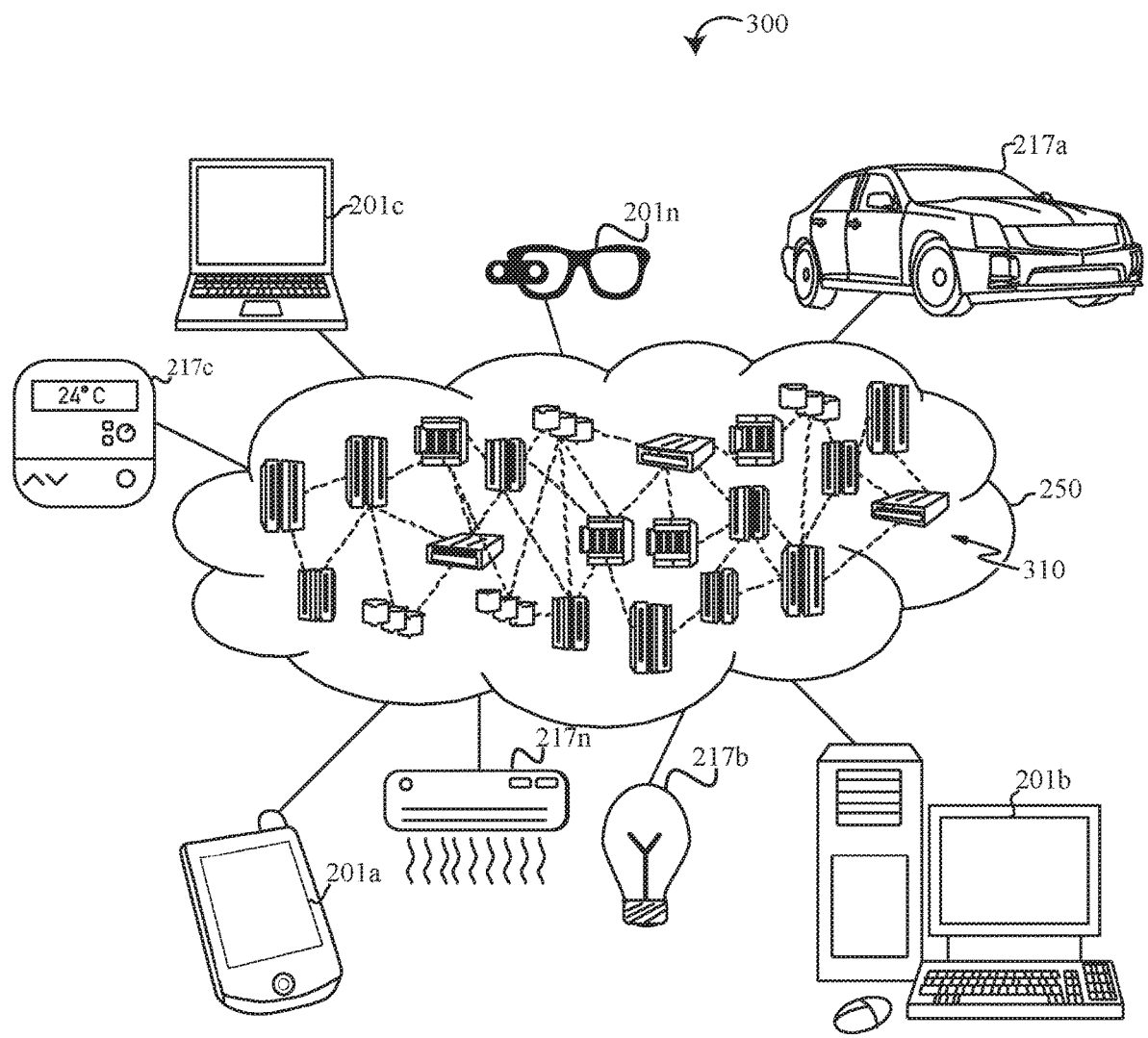
FIG. 3 depicts an embodiment of a cloud computing environment within which embodiments described herein may be implemented in accordance with the present disclosure.

Referring to the drawings, FIG. 3 is an illustrative example of a cloud computing environment 300. As shown, cloud computing environment 300 includes one or more cloud computing nodes 310 with which IoT devices 217 and client devices 201 can function as user-controlled devices operated or configured by cloud consumers. User-controlled or configured devices may communicate with data collection server 210 or data analysis server 220 of the cloud computing environment 300 through an application interface 203 or a connectivity module 221, connected to the cloud network. For example, via client devices 201*a*, 201*b*, 201*c*, 201*n* and/or IoT devices 217*a*, 217*b*, 217*c*, 217*n* as illustrated in FIG. 3. Nodes 310 of the cloud computing environment 300, such as one or more host systems or edge devices may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms and/or software as services for which a cloud consumer does not need to maintain resources on the client devices 201 or IoT devices 217 connecting or communicating with the nodes 310 of the cloud network. It is understood that the types of client devices 201 or IoT devices 217 connected to the cloud computing environment 300 are intended to be illustrative only and that computing nodes 310 of the cloud computing environment 300 can communicate with any type of computerized device over any type of network and/or network addressable connection (e.g., using a web browser).

Figure 4:
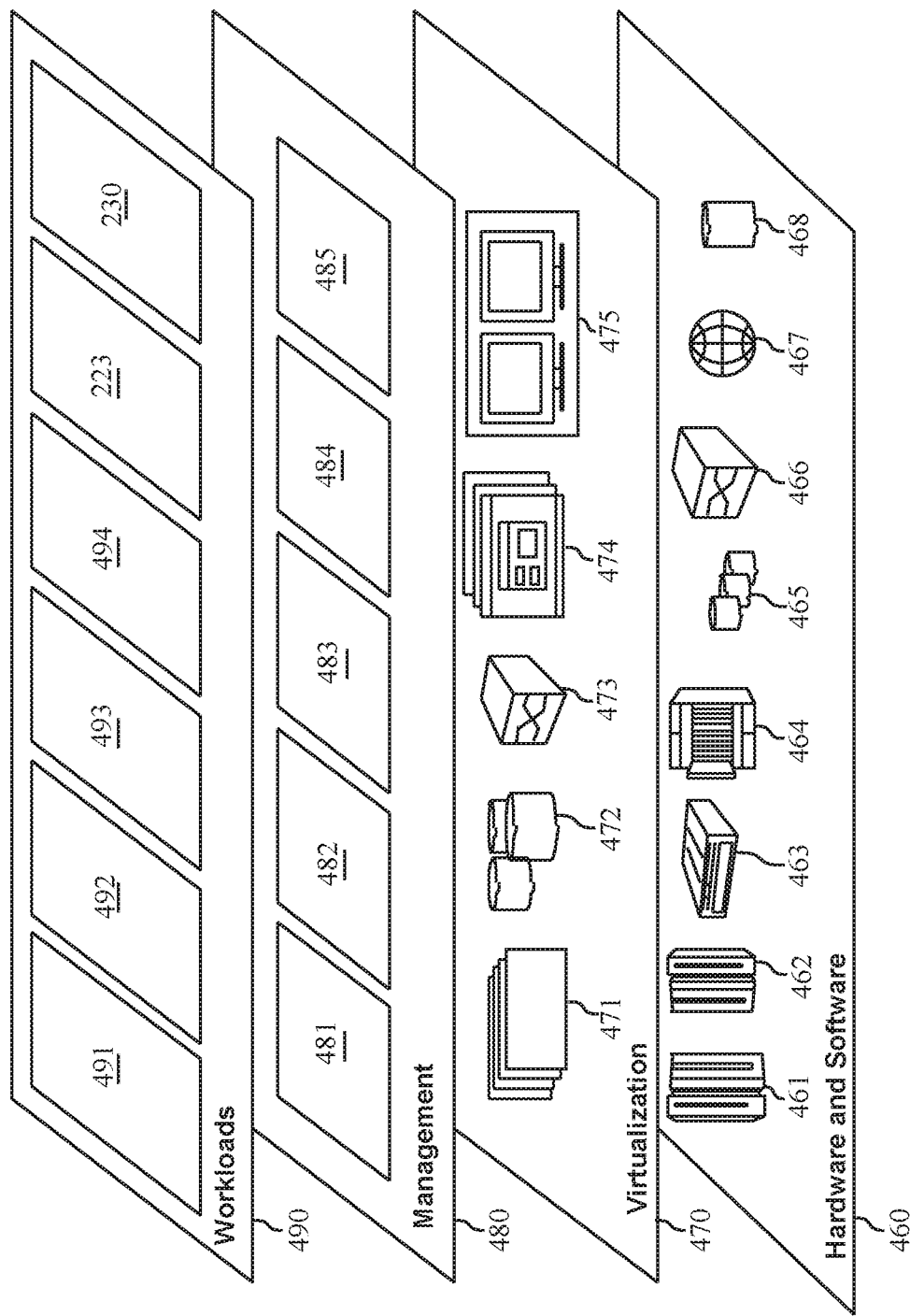
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, virtual classroom education delivery 493, transaction processing 494, an application runtime 223 or containerized application environment controlling one or more configured IoT devices 217, and server API 230 collecting and anonymizing biological information received from client devices 201.

Figure 2A:
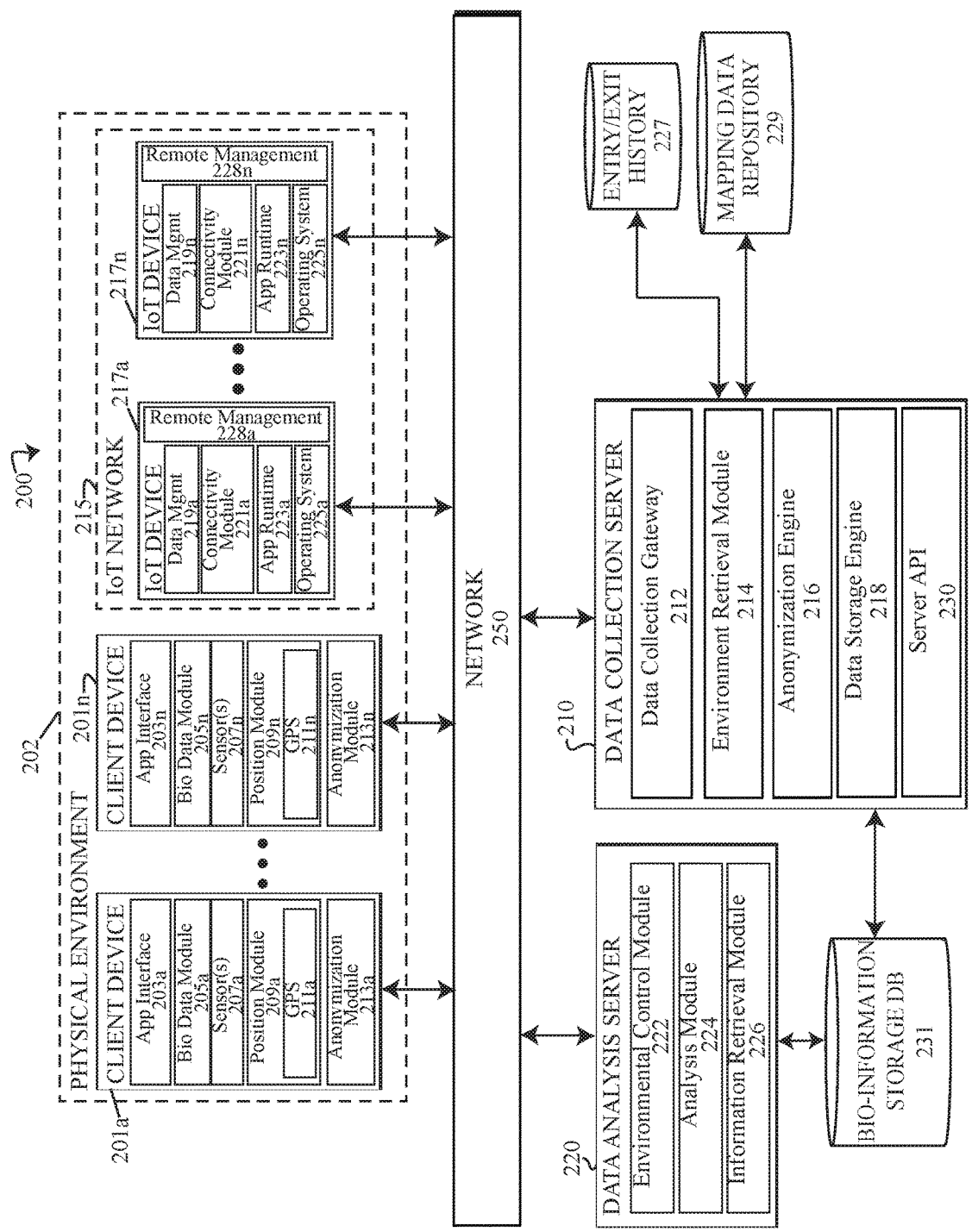
FIG. 2a depicts a block diagram of an embodiment of a computing environment for dynamically controlling a physical environment using anonymized data collected from individuals within the physical environment, in accordance with the present disclosure.

Referring back to the drawings, FIG. 2*a* depicts an embodiment of a computing environment 200 capable of dynamically controlling and managing environmental conditions of a physical environment 202 using anonymized biological data, location data, time series data, personal ID data (the "collected data") and other available information that may be stored and collected from individuals within the physical environment. Embodiments of the computing environment 200 may receive collected data from one or more client devices 201 positioned within a physical environment 202. A client device 201 may refer to data processing system 100 such as a computer system or program 114 that may connect to a remote computer or server, such as the data collection server 210 and/or data analysis server 220. Embodiments of the client devices 201 may be computer hardware (or virtualized hardware) or software that may access a service or program 114 made available by a server 210, 220. Embodiments of client device 201 may comprise one or more components or modules that may be tasked with implementing the functions, tasks or processes of collecting and transmitting the collected data to a data collection server 210. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized data processing systems 100 operating as part of the computing environment 200. Components and modules of the client device 201*a*, 201*n* in the exemplary embodiment shown in FIG. 2*a*, positioned within the physical environment 202, may comprise an application interface 203*a*, 203*n* (abbreviated "app interface"), bio data module 205*a*, 205*n*, sensor(s) 207*a*, 207*n*, position module 209*a*, 209*n*, and/or an anonymization module 213*a*, 213*n*.

Embodiments of the app interface 203*a*, 203*n* (referred to generally as app interface 203) may perform tasks, processes or functions of the client device 201 directed toward receiving, and processing incoming data collection requests from a data collection server 210 or server API 230, communicating with data collection server 210 and transmitting inputs, commands and/or responses to the data collection server 210. Embodiments of the app interface 203 may also be a graphical interface that displays requests, communications and notifications received from the data collection server 210 on a display device 118 of the client device 201. For example, data collection requests transmitted from server API 230 of the data collection server 210 may be received and displayed by the client device and allow for the user of the client device 201 to accept, decline or modify a data collection request. For instance, the app interface 203 may display one or more collection conditions detailing the incoming data collection request from the data collection server 210, including but not limited to the data types being collected, frequency of the data collection, and the level of anonymization being applied to the collected data. In some instances, users of the client device 201 may propose modifications to the collection conditions of the data collection request. For example, by modifying permission for the data types that will be collected, the frequency of the data collection and/or increasing the anonymization level being applied to the collected data. In some embodiments, a user of the client device 201 may pre-set acceptable data collection conditions, whereby data collection requests that do not meet the pre-set data collection conditions may be denied by the app interface 203 automatically. For example, a user sets a pre-set anonymization level, whereby a data collection request with collection conditions having an anonymization level below the pre-set anonymization level will automatically be declined via a response from the app interface 203. Alternatively, a pre-set anonymization level or data types approved for collection by the user may also permit the client device 201 to collect and transmit the requested data from the client device 201 to the data collection server 210 and/or a second client device 201 automatically, without requiring approval or notification to the user.

Embodiments of the client device 201 may further comprise a biological information data module 205*a*, 205*n* (referenced in FIG. 2*a* as "bio data module") and may be referred to generally as bio data module 205. The bio data module 205 may perform tasks or functions of the client device 201 directed toward the aggregation and/or storage of biological information collected, saved and/or accessible to the client device 201 (locally or remotely). Embodiments of the bio data module 205 may aggregate and/or store biological data inputted or accessible to the client device 201. For example, biological data that may be inputted by the user, such as through direct input into forms or other data entry formats and/or via input into one or more sensors 207*a*, 207*n* (referred to generally as sensors 207), recording devices, cameras and other internal or external device(s) 117 connected to the client device 201. Embodiments of the client device 201 may capture and store biological data inputted into the client device 201. For instance, a user may input information describing the user such as the user's name, age, sex, height, weight, eye color, waist size, shoe size, head circumference, etc. In other instances, one or more sensors 207 and/or recording devices may collect biological data about the user as the user is operating the client device. For example, biometric data about the user may be obtained or measured by one or more sensors 207 or recording devices that are integrated into or connected to the client device 201, including, but not limited to a user's height, weight, eye color, etc. Moreover, sensors 207 and/or recording devices may also measure physiological information about the user, the surrounding physical environment 202 and effects of the surrounding physical environment 202 on the user including but not limited to the user's heart rate, body temperature, respiration rate, movement speed, acceleration, angle of orientation, proximity of client device 201 to the user, ambient lighting, eye strain, humidity, perspiration rate, etc. Biological data, including physiological measurements collected by the client device 201 may be formatted and/or stored in the memory 105 and/or persistent storage 106 of the client device 201, the bio data module 205 or remotely accessible in one or more repositories connected to the client device 201 via network 250.

Embodiment of the bio data module 205 may time stamp the biological and/or physiological data collected by the bio data module 205. The bio data module 205 may parse the data collected and stored by the bio data module 205 and classify the collected data and data types. Upon receiving a data collection request from a data collection server 210 or a second client device 201, the bio data module 205 may query the stored biological and/or physiological data being requested and may selectively provide the requested data. For example, retrieving the requested data based on recording date/time, by data type, data classifications applied to data sets, one or more particular sensors 207 or recording devices measuring the collected data, etc.

Embodiments of the client device 201 may comprise a position module 209a, 209n (referred to generally herein as "position module 209"). Embodiments of the position module 209 may perform the task or function of determining a location of the client device 201 at a specific point in time by periodically collecting location data associated with the client device 201. Location data may help determine which physical environment 202 the client device 201 is positioned within. The position module 209 may collect location data using one or more techniques or technologies and store the location data of the client device 201 to a memory 105, persistent storage 106, cache 107 of the position module 209 and/or storing the location to a remotely accessible repository accessible via network 250. For example, storing location data to a location data history repository comprising a positional history of the client device 201 based on the location data collected and transmitted by the position module 209. Embodiments of the position module 209 may format the collected location data and store a history of the client device's 201 location at particular points in time. Various techniques and technologies for collecting location data about the client device 201 may include using an onboard GPS 211a, 211n device to collect GPS location data, tracking a mobile device signal through cellular tower connections, cell tower triangulation, Wi-Fi connection tracking, Bluetooth connection tracking, near-field communication (NFC) tracking based on communication with NFC-tags, RFID communication tracking and a combination of tracking methods thereof.

Embodiments of client device 201 may comprise an anonymization module 213a, 213n (referred to generally herein as "anonymization module 213"). Embodiments of the anonymization module 213 may perform the functions or tasks of anonymizing the biological and physiological data collected by the bio data module 205, location data collected by the position module 209 and individual IDs that may be associated with identifying the client device 201. Data outputted by the anonymization module 213 may prevent receiving devices that may be processing the collected data, such as one or more client devices 201 or data collection server 210 from identifying the user of client device 201, the user associated with the collected data, personal information or personal identifying information. The anonymization module 213 may anonymize the data being transmitted by the client device 201 before the data is transmitted to a second client device 201 or data collection server, instead of relying on the recipient data collection server 210 or second client device 201 to subsequently anonymize the data.

Embodiments of the client devices 201 receiving a data collection request from a data collection server 210 and/or another client device 201 may include, as part of the data collection request, information describing the anonymization level for the data being collected and transmitted between client devices 201 and/or data collection server 210. Embodiments of the client devices 201 receiving the data collection requests may also receive a scheme of statistical processing used by the application for anonymizing the requested data and in some instances, dummy data. Embodiments of the anonymization module 213 may anonymize the requested data consistent with the scheme for statistical processing, as specified in the data collection request before transmitting the requested data to another client device 201 or the data collection server 210. Examples of statistical schemes for processing data into anonymized data may include (but are not limited to) maximum value schemes, average value schemes and schemes for processing multiple pieces of data to satisfy k-anonymity.

In embodiments of the computing environment 200, 260, 300 wherein a maximum value statistical processing scheme is performed, the data collection server 210 transmitting the data collection request and prescribing the statistical processing scheme may also transmits a query ID to the first client device 201 receiving the data collection request. The first client device 201a may transmit the query ID and a value(s) of the first client device's 201 requested data to a second client device 201b. Embodiments of the second client device 201b receiving data values describing the requested data from the first client device 201a may be compared with the data values of the second client device 201b for the same types of data being requested. Embodiments of the anonymization module 213 of the second client device 201b may transmit the query ID and the larger of the received value from the first client device 201a and the value of the requested data stored by the second client device 201b to the next client device 201 in a series of client devices 201 wherein data is being requested. Embodiments of the anonymization module 213 for each subsequent client device 201 receiving the query ID and the data value(s) from the previous client device 201 may compare the received data value with the data value stored by the current client device 201 receiving the request for data collection. By continuously sending the larger of the received data value or the stored data value of the current client device 201 in the series of client devices 201, the maximum value for the data is being transmitted between the client devices 201, before eventually being transmitted to the data collection server 210. Once the same query ID is received again by a client device in the series of client devices, the client device 201n (i.e. the last client device 201 in the series of client devices before returning the data value to the data collection server 210) receiving the same query ID a second time, may become a representative client device 201. The representative client device 201 may transmit the data value(s) received from the previous client device 201 to the data collection server 210.

In embodiments of the computing environment 200, 260, 300 wherein the statistical processing scheme is calculated by the average value of the collected data, a data collection server 210 transmitting a request to one or more client devices 201 may transmit the data collection request along with dummy data. Embodiments of the client device(s) 201 receiving the data collection request and dummy data may anonymize stored data via the anonymization module 213 by transmitting a data value(s) for the requested data stored by the client device 201 plus the sum of the dummy data and a data set describing the total number of data values (i.e. number of data values from client device(s) 201 and dummy data values). The client device 201 may transmit the sum of the data value plus dummy data and the data set describing the total number of data values to the next client device in a series of client devices 201 where data is being collected from within the surrounding environment 202. In some embodiments, collected data values may be transmitted between client devices in a prescribed order or sequence of client devices 201 within the series of client devices 201. The anonymization module 213 of receiving client device 201 in the series of client devices 201, adds the sum of the requested data value stored by the receiving client device 201 to the received sum of data values/dummy data, and adds to the data set describing the total number of data values, the number of data values contributed to the sum of data values.

The process of adding data values stored by the receiving client device 201 to the sum of the data values/dummy data and modifying the total number of data values in the data set, may continue until each of the client devices 201 (or participating client devices) within the physical environment 202 has provided the requested data being collected to the sum of the data value/dummy data. Alternatively, in some embodiments, the process of transmitting the collected data values and dummy data may continue until a threshold amount of data is collected, as determined by one or more collection conditions transmitted by the data collection server. Upon transmitting the sum of the data values/dummy data and the data set indicating the total number of data values in the sum of data values to the last client device 201n in the series of client devices or the last client device 201n wherein the threshold amount of data is collected, the last client device 201n may transmit the sum of data values/dummy data along with the data set describing the total number of data values in the sum of data values/dummy data to the data collection server 210. Embodiments of the data collection server 210 may calculate the average value by subtracting out the dummy data values from the sum of the data values/dummy data and removing the number of dummy data values from the data set describing the total number of data values. Accordingly, the average data value can be calculated by dividing the sum of the data values (with the dummy data removed) by the total number of data values in the sum of data values (once accounting for the removal of the dummy data values. The average value may be described by the following equation:

$$\frac{\text{(the sum of data values collected - the dummy data value(s))}}{\text{(the total number of data values in the sum of data values - a total number of dummy data values)}}$$

For example, a data collection server 210 transmits a data collection request and dummy data comprising a data value of 23 and the total number of data values is 1 (the dummy data). The data value/dummy data and the total number of data values may be written as (23,1). The data collection server 210 transmits the dummy data and the data set comprising the total number of data values to a first client device 201a. First client device 201a receives the data collection request, dummy data value and data set describing the total number of data sets. For instance, if the data value of the first client device 201a is 45, the data value/dummy data is updated and modified to reflect a total value of 68 and a total number of data values is modified to 2, resulting in (68,2). Likewise, if the data values and total number of data values is transmitted to a series of client devices 201 further comprising client device 201b (value=1), client device 201c (value=4) and client device 201d (value=9), then as the data collection request is transmitted from client device a to b to c to d, the change in the sum of the data values/dummy data and the total number of data values may be reflected as follows: server (23,1) to client device 201a: 45 (68,2) to client device 201b:1 (69,3) to client device 201c: 4 (73,4) to client device 201d: 9 (82,5). When the server receives the data values and total number of data values from client device 201d, the server can calculate the average value as follows:

$$\text{Average Value} = \frac{(82-23)}{(5-1)} = 16.5$$

In some embodiments calculating the average value may include different values of dummy data being transmitted to client devices 201 in one or more series of client devices 201. Continuing the example above directed toward client devices 201a-201d, client devices 201e to 201h may be part of a second series of client devices receiving a data collection request that begins with data collection server 210 transmitting dummy data with a value of 4 (4,1) to client device 201e which comprises a data value of 23 for the data being collected. Accordingly, client device 201e: value=23 (27, 2) to device 201f: value=11 (38, 3) to device 201g: value=33 (71, 4) to device 201h: value=90 (161, 5). The average value of the collected data for client devices 201a to 201h, accounting for the different dummy data values may be calculated as follows:

$$\text{Average Value} = \frac{(82+161-23-4)}{(5+5-1-1)} = \frac{216}{8} = 27$$

In some embodiments, anonymization of data collected may be performed by the anonymization module 213 of the client device 201 in instances where multiple pieces of data are requested from the client device 201 positioned within a physical environment 202. In such an instance, embodiments of the anonymization module 213 may receive and/or inject dummy data from dummy records comprising a combination of dummy data values for the combination of different types of data values being requested. For example, a dummy record may be transmitted by the data collection server 210 and accompany the request for data collection to a first client device 201a. Embodiments of the first client device 201a may select a combination of dummy records that satisfy the anonymity level of the data collection conditions, for example, until k-anonymity is satisfied and transmit data values stored by the first client device 201a to a second client device 201b in a series of client devices 201. Each subsequent client device 201 in the series of client devices 201 may combine stored data with the dummy record (depending on the statistical processing scheme) or retrieve and/or inject additional dummy records for the data types being collected into the data being collected by the bio data module 205, position module 209 and/or individual ID data.

Embodiments of the computing environment 200, 260, 300 may comprise a data collection server 210. The data collection server 210 may comprise one or more components and/or modules for performing the tasks or functions of preparing and transmitting data collection requests, receiving requested data from one or more client devices 201, retrieving environment data describing physical environment 202, stored by one or more repositories, as well as anonymizing and processing collected data for storage and/or further processing by a data analysis server 220. In the exemplary embodiment depicted in FIG. 2a, the data collection server may comprise a data collection gateway 212, environmental retrieval module 214, anonymization engine 216, a data storage engine 218 and a server API 230.

Embodiments of the data collection gateway 212 may be perform functions, tasks and processes associated with managing data collection from one or more client devices 201 positioned within a physical environment 202 that may be connected to network 250. Embodiments of the data collection gateway 212 may transmit data collection requests via the service API 230 communicating with the client devices 201. In some embodiments, data collection gateway 212 manages the data collection requests by configuring the data collection requests with a set of collection conditions. The set of collection conditions may define the data types being collected such as biological/physiological data, location data, individual IDs, time data, classifications of data, set threshold amounts of data to collect from client devices 201, and prescribe a level of anonymization applied to the collected data. Furthermore, embodiments of the data collection gateway 212 may define the type of statistical processing scheme being applied to the collected data, as well as transmit dummy data and/or dummy data records that may be transmitted to the client devices 201 alongside the data collection requests, providing client devices 201 with an ability to anonymize the collected data client side, rather than performing anonymization of the collected data server side at the data collection server 210.

In some embodiments, the data collection gateway 212 may further manage communications and notifications transmitted to the client device as part of the data collection request. For example, the data collection gateway may transmit notifications to the client device 201 describing the details of the data collection, including the collected data types, data classifications and anonymization level being applied to the collected data in accordance with the collection conditions of the data collection request. Data collection gateway 212 may request permission to collect the prescribed data and may process responses received from client devices declining to provide the requested data. In some embodiments, the data collection gateway 212 may manage the transmission of incentives to client devices 201 receiving data collection requests. For example, incentives may include discounts on usage fees, entry fees, tickets or other access credentials associated with a physical environment 202, products that may be sold within the physical environment or other types of coupons or discounts. The incentives transmitted to the client device 201 may be conditional upon the client device 201 providing requested data prescribed by a data collection request and/or acceptance of the data collection request may be condition that must be accepted in order for users of the client device 201 to access a physical environment 202 or a particular facility within a physical environment. For example, accessing a VIP location, privately reserved space or upgraded seating locations for users who have accepted data collection requests from the data collection gateway 212.

Requested data successfully collected from client devices 201 complying with the data collection requests may be received by the data collection gateway 212 of the data collection server 210. Embodiments of the data collection gateway 212 may manage further processing and storage of the collected data by one or more components or modules of the data collection server 210. For example, processing and/or storage by the environmental retrieval module 214, anonymization engine 216, and data storage engine 218.

Embodiments of the environmental retrieval module 214 may perform functions and/or tasks of the data collection server 210 associated with identifying the location of the surrounding physical environment 202 based upon the data collected from the client device 201 at the time the client device 201 transmits the collected data. The environmental retrieval module 214 may identify locations of the physical environment 202 wherein the client device 201 is located by analyzing location data that may be provided by the position module 209 of the client device 201 as well as individual IDs that may be associated with the user and/or client device 201 that may track or identify the movement of the client device 201 from location to location. For example, scanning a badge ID or identification card comprising credentials.

The environmental retrieval module 214 may cross reference location data and/or individual IDs collected from the client device 201 with one or more accessible data sources that may provide additional information about the client device's 201 location and/or position within the physical environment 202. For example, in the embodiment depicted in FIG. 2a, the environmental retrieval module 214 may query data sources such as the entry/exit history repository 227 and/or the mapping data repository 229 to retrieve additional data that may be analyzed to pinpoint the client device's 201 position within the physical environment 202. For instance, mapping data retrieved from the mapping data repository 229 may be queried using information from the location data collected from the position module 209 in order to retrieve mapping information about the physical environment 202, such as the building layout, room locations, floor blueprints, landmarks, equipment positioning, positioning of nearby IoT devices 217, and other data processing systems, etc.

In another example, embodiments of the environmental retrieval module 214 can query entry and exit information maintained by a repository responsible for logging and tracking entry and exit data of individuals or client devices 201 in the entry/exit history 227 repository. The environmental retrieval module 214 may query the entry/exit history 227 repository using individual IDs as the search criteria and obtain data describing a user or client device's 201 ingress or egress within a physical environment 202. The tracking of a ingress or egress and the associated times of entering and exiting a physical environment 202 may allow for the data collection server 210 to track and pinpoint movements and the positions of the user and/or client device 201 transmitting the collected data to the data collection server 210 and associate timing of a data collection from a particular client device 201 with the most probably positioning of the client device 201 within the physical environment 202.

Embodiments of the anonymization engine 216 may perform the tasks or functions of the data collection server 210 associated with anonymizing data collected from client devices 201 in response to a data collection request. In some embodiments, client devices 201 may anonymize the collected data transmitted to the data collection gateway 212 prior to the transmission of the data. For example, client devices 201 positioned within the same physical environment 202 may share anonymized biological data, physiological data, location data, time data and individual IDs with nearby client devices 201 or a series of client devices 201 which form client device groups. Anonymized data collected from the client devices 201 in a series of client devices 201 may be transmitted from client device 201 to client device 201 until a threshold amount of data, types of data, individual ID's, etc. as prescribed by the data collection conditions are met. The anonymized data transmitted between nearby client devices 201 may continue until the threshold amount of data collection is achieved, whereby at the point in time when the threshold amount of data is collected, the client device 201 may be considered a representative client device and transmit the data collected from the series of client devices 201 to the data collection server 210.

However, in some instances of data collection requests, the anonymization engine 216 of the data collection server 210 may anonymize the collected data received from one or more client devices 201 after the collected data is received by the data collection gateway 212. Embodiments of the anonymization engine 216 may anonymize the collected data, including individual IDs, biological and physiological data, location data and/or time data using one or more anonymization techniques known by a person skilled in the art. For example, the collected data may be anonymized using techniques such as data masking, pseudonymization generalization, data swapping, data perturbation and combinations of methods and techniques thereof. In some instances, embodiments of the anonymization engine 216 may inject synthetic data values into collected data sets, such as the dummy data or artificial data sets.

Embodiments of the data collection server 210 may comprise a data storage engine 218. The data storage engine 218 may be described as a software module used by a management system of a repository, such as a database, to create, read, write and update a repository. Embodiments of the data storage engine 218 may perform functions and tasks of the data collection server 210 directed toward creating, reading, writing and updating a repository for storing the anonymized data collected from the client devices 201. As shown in FIG. 2a, the repository can be a storage database such as the bio-information storage database 231 shown in FIG. 2a. Embodiments of the bio-information storage database 231 may create, and maintain records of the anonymized data collected by the data collection server 210, including not only the collection of anonymized biological data, but also physiological data, time data, location data and individual IDs describing users and/or client devices 201. The data storage engine 218 may create or write new records to the bio-information storage database 231 and/or update existing records of collected data, which may be accessed and analyzed by a data analysis server 220 or another type of analysis system capable of making determinations about a physical environment 202 based on the analysis of the records of the data collected by the data collection server 210.

Embodiments of the computing environment 200, 260, 300 may comprise a data analysis server 220. The data analysis server 220 may perform functions and tasks of the computing environment 200, 260, 300 directed toward the extraction of anonymized collected data from the bio-information storage database 231 for a specified physical environment at one or more periodic or random points in time, analyze the extracted anonymized data, draw conclusions about one or more adjustments to the physical environment 202 based on the analysis of the anonymized data and implement one or more environmental controls that may physically alter or impact the physical environment. Embodiments of the data analysis server 220 may comprise one or more components and/or modules for executing the functions or tasks of the data analysis server. For example, in the exemplary embodiment of the data analysis server 220, the data analysis server 220 may comprise an information retrieval module 226, analysis module 224 and an environmental control module 222.

Embodiments of the information retrieval module 226 may perform the function of periodically or irregularly extracting anonymized data from the bio-information storage database 231 using one or more filters or queries functions to extract collected data relating to a specific physical environment. Extraction of the anonymized data from the bio-information storage database 231 may occur at regular intervals, such as every minute, every hour, every day, every week, every month, etc. in some instances or based on the physical environment 202 being analyzed. In other instances, or based on the physical environment 202 being targeted for analysis, the information retrieval module 226 may extract the anonymized data from the bio-information storage database 231 at an irregular, randomized or variable period of time. Data extracted from the bio-information storage database 231 by the information retrieval module 226 may be stored in the memory 105 or cache 107 of the data analysis server 220 in some embodiments, for further analysis and processing by the analysis module 224. In some embodiments, the anonymized data extracted from the bio-information storage database 231 may be transmitted to the analysis module 224 for analysis, whereby the analysis module 224 may store the anonymized data in a dedicated memory 105, cache 107 or persistent storage 106 device of the analysis module 224.

Embodiments of the analysis module 224 may apply one or more analysis techniques to the anonymized data extracted from the bio-information storage database 231 to obtain insights about the surrounding physical environment 202 targeted for analysis and a potential number of modifications or environmental controls that may be implemented to change the physical environment based on the results of the analysis by the analysis module 224. Conclusions drawn by the analysis module 224 may be converted to one or more instructions for modifying the physical environment 202 in a manner consistent with the output from the analysis module 224. Embodiments of the analysis module 214 may analyze the anonymized data extracted from the information retrieval module 226 using semi-real-time analysis or offline analysis modes.

In some instances, the analysis module 224 may adjust the collection conditions of the data collection request and/or the anonymization level of the data collection request. The analysis module 224 may transmit recommendations and/or implement the proposed changes to the data collection conditions or anonymization level via the data collection server 210. For example, the analysis module 224 may require additional data from the client devices 201 positioned within the surrounding physical environment 202, however using the current collection conditions or anonymization level, an insufficient number of client devices 201 have participated in fulfilling the data collection request. Therefore, the adjustment of the collection conditions or anonymization levels may be implemented to increase the number of predicted client devices 201 willing to participate in data collection and allow the analysis module 224 to achieve a sufficient amount of anonymized data to improve analysis and proposed changes to implement within the surrounding environment 202.

Embodiments of the environmental control module 222 implement the one or more instructions for modifying the physical environment 202 based on the analysis and conclusions about the physical environment 202 as a function of the anonymized data. For example, in some embodiments, the environmental control module 222 may issue notifications and/or reports to one or more individuals employed to maintain the physical environment 202 to perform one or more actions that impact or physically alter the physical environment 202. In other instances, the environmental control module 222 may transmit instructions to one or more IoT devices 217a, 217n of an IoT network 215, which may be positioned within a physical environment 202. The environmental control module 222 may issue commands to the IoT network 215 and/or individual IoT devices 217 to employ particular actions that may affect and/or physically alter the environment of physical environment 202. In some embodiments, the instructions from the environmental control module 222 may be an alteration to one or more settings of an IoT device 217.

For example, the IoT devices 217 of the IoT network 215 may maintain the climate of the physical environment 202, including heat and air conditioning settings, lighting settings, positions of windows or window coverings, etc., and thus, by altering an IoT device 217 setting, the environmental control module 222 may physically affect the physical environment 202 by implementing changes to the surrounding temperature, light bulbs, open or close windows, etc. In another example, the analysis module 224 may track known foot traffic patterns for a building or the number of customers that ride a train or other form of transportation. Based on the analysis of the analysis module 224, the environmental control module 222 can impact building or transportation management based on known cycles for increased traffic through a building. For instance, by modifying elevator controls, varying medical equipment placement to prioritize the more congested sections of the physical environment 202, adding cars to a train, changing or increasing the number and type of services offered based on the number of passengers, predict congestion within retail locations and sales and modify menus and/or prices accordingly. For example, IoT devices 217 of an IoT network 215 within a physical environment may include digital signage. During particular hours of the day, the IoT devices 217 operating as signs or menus may be altered by the environmental control module 222 to reflect the types of foods being served and/or changes to the prices based on the number of anticipated customers, etc.

FIG. 2a further depicts an example of architecture of one or more IoT devices 217 in an IoT network 215, that may be controlled or altered by the environmental control module 222 to change the surrounding physical environment 202. Components of the IoT devices 217 may comprise a data management module 219, a connectivity module 221, an application container or runtime environment (referred to as "application runtime 223") 223, an operating system 225 and a remote management module 228.

Data management module 219 may provide local persistence to support IoT network 215 latency, offline mode and real time analytics at edge nodes of network 250 as well as the ability to forward IoT device 217 data in a consistent manner to one or more IoT platforms or servers and act as a scalable data store that supports the volume and variety of IoT data that may be generated by the IoT network 215. In some embodiments, data management module 219 may also operate as a device management and/or device registry for identifying one or more IoT devices or gateways operating within an IoT network 215 or solution. Data management module 219 may provision new IoT devices 217 and software updates for existing IoT devices 217 of the IoT network 215.

Connectivity module 221 supports IoT connectivity protocols allowing the IoT devices 217 to connect to and communicate with other IoT devices 217 and IoT gateways of the IoT network 215. The connectivity protocols supported by the connectivity module 221 may include protocols such as Bluetooth, Wi-Fi, Z-Wave, Zigbee, etc. Moreover, the connectivity module 221 may support connectivity of IoT gateways of the IoT network 215 to network 250, for example support to connect via ethernet, cellular, Wi-Fi, satellite, etc. Connectivity module 221 may also ensure reliability and security of communications within IoT network 215 (i.e. between IoT devices 217) and with one or more servers 210, 220 and client devices 201 of network 250.

Embodiments of the application runtime 223 is an application environment (such as a containerized environment) capable of executing and running application code, allowing for applications running on the IoT devices 217 or within IoT network 215 to execute or be dynamically updated. Operating system 225 of the IoT device 217 may be software that supports the basic functions of the IoT device 217, including the scheduling of tasks, executing applications and/or controlling one or more peripheral devices or sensors connected to the IoT device 217. Remote management module 228 of the IoT devices 217 may perform functions dedicated to remotely provisioning, configuring, starting up, and/or shutting down gateways of the IoT network 215 as well as applications that may be running on the gateways of the IoT network 215.

Examples of Dynamically Controlling a Physical Environment Using Collected and Anonymized Biological Information Example #1—Determination of Location of Installation of AEDs Embodiments of the computing environments 200, 260, 300 may be implemented for determining the locations for installing automated external defibrillators (AEDs) within surrounding physical environment. AEDs are typically located on well-separated places within a physical environment. For example, AEDs may be spaced several floors apart, such as the 5th and 10th floors, or simply where many people may be known to gather based on the anonymized collected data, such as the cafeteria. Anonymized data collected from a plurality of client devices 201 positioned on each floor of a building may provide insights based on the analysis of the analysis module 224, into the locations where people with the highest risk of cardiac arrest may pass and stay while in the surrounding physical location. Anonymized data may be extracted and analyzed weekly and monthly and a determination of optimal places of installation for AEDs may be concluded, then subsequently implemented by individuals or businesses maintaining the surrounding physical location.

Example #2—Determination of Dangerous Intersections

In recent years, requirements to install guardrails on sidewalks at intersections to protect pedestrian safety is slowly being mandated. Guardrail installation, however, may take a long amount of time to complete. Prioritization of the intersection guardrails may be important for improving traffic safety for pedestrians and drivers. Embodiments of the present application can collect anonymized data from client devices 201 directed toward heart rate data of drivers and determine the risk of intersections using the collected heart rate data. For example, identifying heart rate data of drivers that is estimated to cause near misses of pedestrians or other accidents. Embodiments of the environmental control module 222 to prioritize construction and installation of guardrails at intersections estimated to be the most dangerous based on the collected data.

Example #3—Control of Room Environment Including Control of Temperature and Lighting of a Room In some surrounding physical environments 202, if the number of people in a classroom is equal to or less than a certain threshold A (e.g. 5 people), it may be easy to identify individuals. Under such conditions, age and gender of individuals may be precluded from data collection, such as in situations directed toward the comfort of individuals within a particular environment. For example, when modulating the temperature of a room or other physical environment 202, for instance by modulating an air conditioner, secondary data that has already been analyzed using the biological information (comfort/discomfort indices, etc.) may transmitted. In some instances, where a threshold is number of people is not met, biological data that may give away a personal identity, such as age and gender may be added as dummy data until the number of people in the classroom increases to reach a certain threshold B (e.g., 15 people). As the number of individuals further increases, it will be difficult to identify individuals, allowing for detailed biological information to be transmitted. In addition to the number of people, the average age of the group or mass may be taken into account. (For example, in the case of an elderly group or mass, the risk of poor physical condition is high and detailed information should be collected).

Example #4 Staffing Medical, Nursing and Childcare Facilities

In physical environments 202 such as hospitals, nursing and childcare facilities, it may not be possible to deal with abnormalities in patients and residents that may occur at multiple locations simultaneously due to personnel shortages during certain times of the day or during holidays. Such a shortage of personnel in the event of an abnormality can be predicted by collecting and monitoring collected data describing one or more physical conditions of patients and residents. The collection of data describing physical conditions of patients and/or residents may allow for the analysis module 224 to maintain and predict response capabilities of the facilities and predict modifications to staffing positions and/or requirements that can provide preventive allocation of reserve personnel and/or alleviate requests for support from neighboring floors and buildings of the facilities.

Example #5 Operation of Public Transportation

Embodiments of the present disclosure described herein may be applicable to public transportation services such as trains, planes, and buses. Embodiments of the present disclosure can be used to modify and maintain comfortable environments within the public transportation, for example by managing and adjusting vehicle air conditioning or ensuring vehicle operations remain on schedule by modifying and controlling vehicle operation (i.e. by administering changes to waypoints, control of driving speed, etc.) by collecting passengers' biological, physiological, location and time data. Fine-tuned air-conditioning management on a per-vehicle basis in railways and flexible operation management such as adding cars, increasing the number of services, and the like according to passengers' physical conditions can be performed. The embodiments of the present disclosure will also be particularly effective for maintaining and adjusting busing schedules and vehicle management for elderly facilities, hospitals, and schools.

Example #6—Prediction of Demand for Restaurants

In employee cafeterias and restaurants there may be need to provide a large amount of meals intensively within a short amount of time. Hot-selling items and demand may be predicted based on customer activity, sweating, physical and mental stress, etc. and modifications to the surrounding environment 202 may be implemented to ensure customers are not leaving the surrounding physical environment without being served due to delayed cooking or changing locations to other restaurants due to food items being sold out or slow service. Since there may be a risk of an individual's being identified during off-peak period when few customers may reside within a restaurant, a dynamic change of the anonymization level may be implemented to the data collection from client devices 201. Data collection and anonymization levels may be adjusted to include detailed information that may not be personally identifying but may help manage customer service and make predictions about the customer habits via the collected data. For example, collecting data such as blood sugar levels, heart rate, and respiration rate is collected by the data collection server 210 and the data analysis server 220 may extract the anonymized data to make detailed predictions about demand for particular food items, seating, and/or general environment about the restaurant.

Figure 2B:
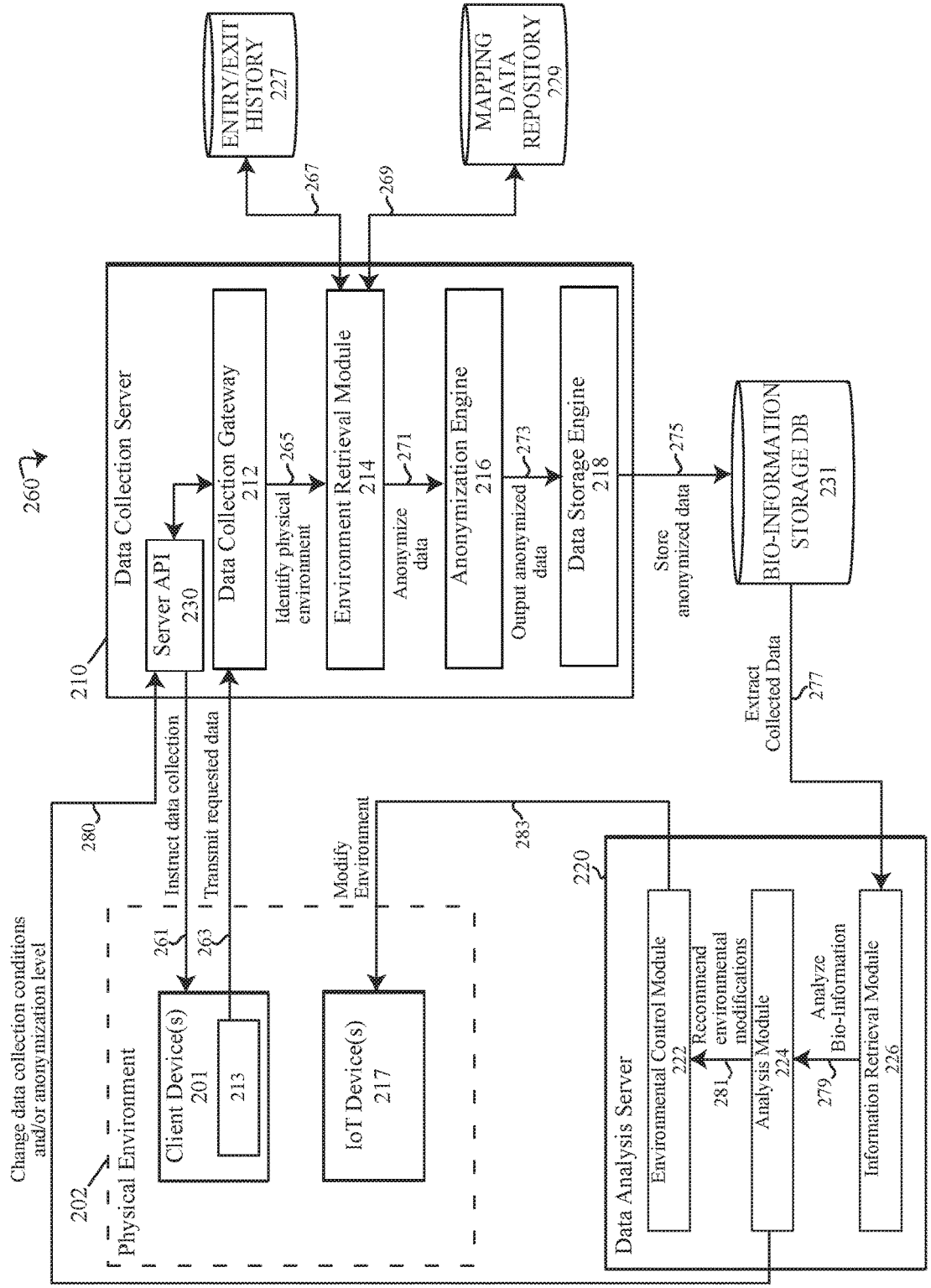
FIG. 2b depicts a flowchart describing a system, method and/or computer program product for dynamically controlling a physical environment using anonymized data collected from individuals within the physical environment, in accordance with the present disclosure.

Method for Dynamically Controlling a Physical Environment Using Collected and Anonymized Biological Information The drawing of FIG. 2b depict a flow diagram providing an example process for dynamically controlling a physical environment 202 using anonymized data collected from a group of client devices positioned within a physical environment 202. As shown in FIG. 2b, the process described by computing environment 260 may begin with a data collection request constructed by the data collection gateway 212 being administered to one or more client devices 201 positioned within a physical environment 202 via the server API 230 as indicated by line 261. The client device(s) 201 receive the data collection request instructing the client device(s) to collect the requested data. In some embodiments, such as the embodiment depicted in the flowchart of FIG. 2b, client device(s) 201 accepting the data collection request can anonymize the requested data via the anonymization module 213. Anonymized data may be outputted from the client device 201 and transmitted to the data collection gateway 212 via line 263 as shown. In alternative embodiments, client devices 201 may transmit anonymized data between neighboring client devices 201 positioned within the physical environment 202 (i.e. a series of client devices) until a threshold level of anonymized data requested by the data collection server 210, per the collection conditions of the data collection request, is collected. At the point in time in which the threshold level of anonymized data is collected, the client device 201 compiling the threshold amount of anonymized data may transmit the requested anonymized data to the data collection gateway 212. In yet another alternative embodiment, data collected from the client devices 201 may not be anonymized by the client devices 201 that store the collected data, but rather un-anonymized data may be transmitted by the client devices 201 and subsequently anonymized by the anonymization engine 216 of the data collection server 210.

The data collection gateway 212 receiving the collected data from one or more client devices 201 may further manage and process the collected data to identify the physical environment 202 each client device 201 is positioned within at the time of data collection based on the location data and individual IDs provided by the client device 201. Embodiments of the data collection gateway 212 may deploy the environmental retrieval module 214 to identify the physical environment, as shown via line 265. Based on the location data, the environmental module 214 may query a mapping data repository 229 for mapping data that further pinpoints and/or describes in greater detail the physical environment 202 associated with the location data, as shown by line 269. Moreover, based on the individual IDs collected from the client devices 201, embodiments of the environmental retrieval module 214 may retrieve entry/exit data from a repository comprising entry/exit history 227 as shown in FIG. 2b. The entry/exit history 227 may describe client device 201 movements as the client device 201 and/or user ingresses and/or egresses to and from the physical environment. The querying of the entry/exit history and retrieval of the entry/exit data is depicted by line 267.

As further shown via line 271, the collected data and/or the data retrieved from the entry/exit history 227 and mapping data repository 229 may anonymized by the data collection server's 210 anonymization engine 216 in accordance with the anonymization level and/or statistical processing scheme of the data collection conditions established by the data collection gateway 212. The anonymized data may be outputted from the anonymization engine 216 to the data storage engine 218 as shown via line 273. Embodiments of the data storage engine 218 may process, format, transmit and/or store the anonymized data to a repository by creating, updating and/or writing the anonymized data to one or more records of the repository. For example, as shown in FIG. 2b, the anonymized data is stored to the bio-information storage database 231 by the data storage engine 218, via line 275 as shown.

As shown via line 277, the informational retrieval module 226 of the data analysis server 220 may periodically, irregularly and/or randomly extract anonymized data collected and stored to the bi-information storage database 231. The information retrieval module 226 may extract the anonymized data for analysis and implementation of changes and/or modifications to a physical environment. The extraction of the anonymized data by the informational retrieval module 226 may be based on the target location of the physical environment 202 associated with the anonymized data. The anonymized data extracted from the bio-information storage database 231 may be provided to the analysis module 224 for further analysis and processing as shown via line 279.

Based on the analysis of the analysis module 224, the analysis module 224 may recommend and/or instruct one or more changes or modifications to implement within the physical environment 202. Moreover, the analysis module 224 may recommend or instruct one or more revisions to the data collection conditions or the anonymization level prescribed by the collection conditions. As depicted by line 280, the analysis module 224 may transmit the recommended changes or instructions to the data collection server 210, wherein the proposed changes or recommendations to the collection conditions may be received by the server API 230 for modification and revision by the data collection gateway 212. Embodiments of the environmental control module 222 may receive the recommendations and/or implementation instructions from the analysis module 224, as shown via line 281 and transmit the instructions to one or more individuals maintaining the physical environment 202, one or more data processing systems 100 positioned within the physical environment 202 capable of implementing the instructions or proposed change based on the analysis of the analysis module 224, as depicted by line 283. In the exemplary embodiment depicted in FIG. 2b, the implementation of the recommended changes or modifications to the physical environment 202 may be transmitted to one or more IoT devices 217 positioned within the physical environment 202. In response to the instructions received from the environmental control module 222, the IoT device 217 may modify one or more settings of the IoT device 217 that may physically alter, change or impact the physical environment in response to the change in settings.

Figure 5A:
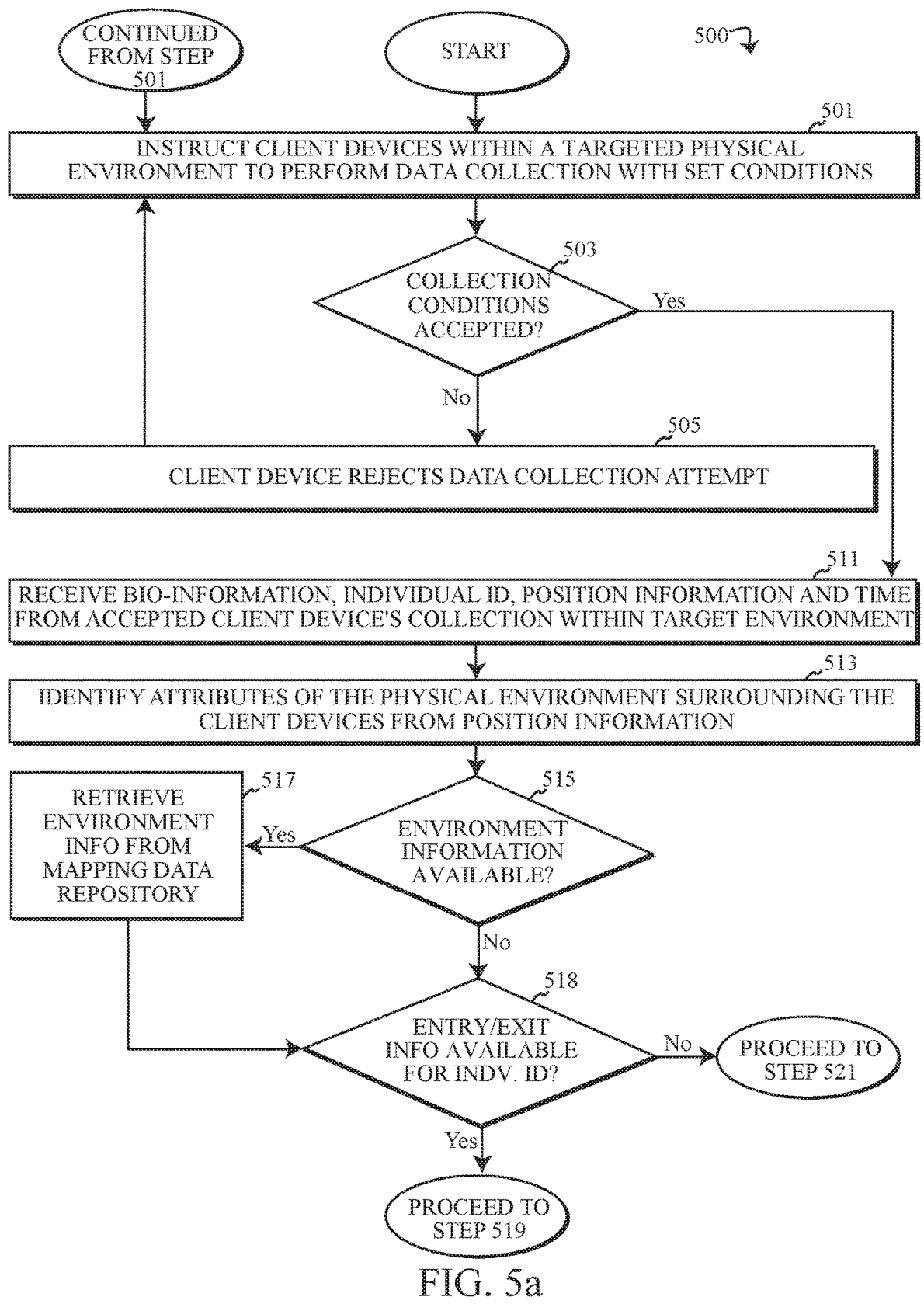
FIG. 5a depicts an embodiment of a method for dynamically controlling a physical environment using anonymized data collected from individuals within the physical environment.
Figure 5B:
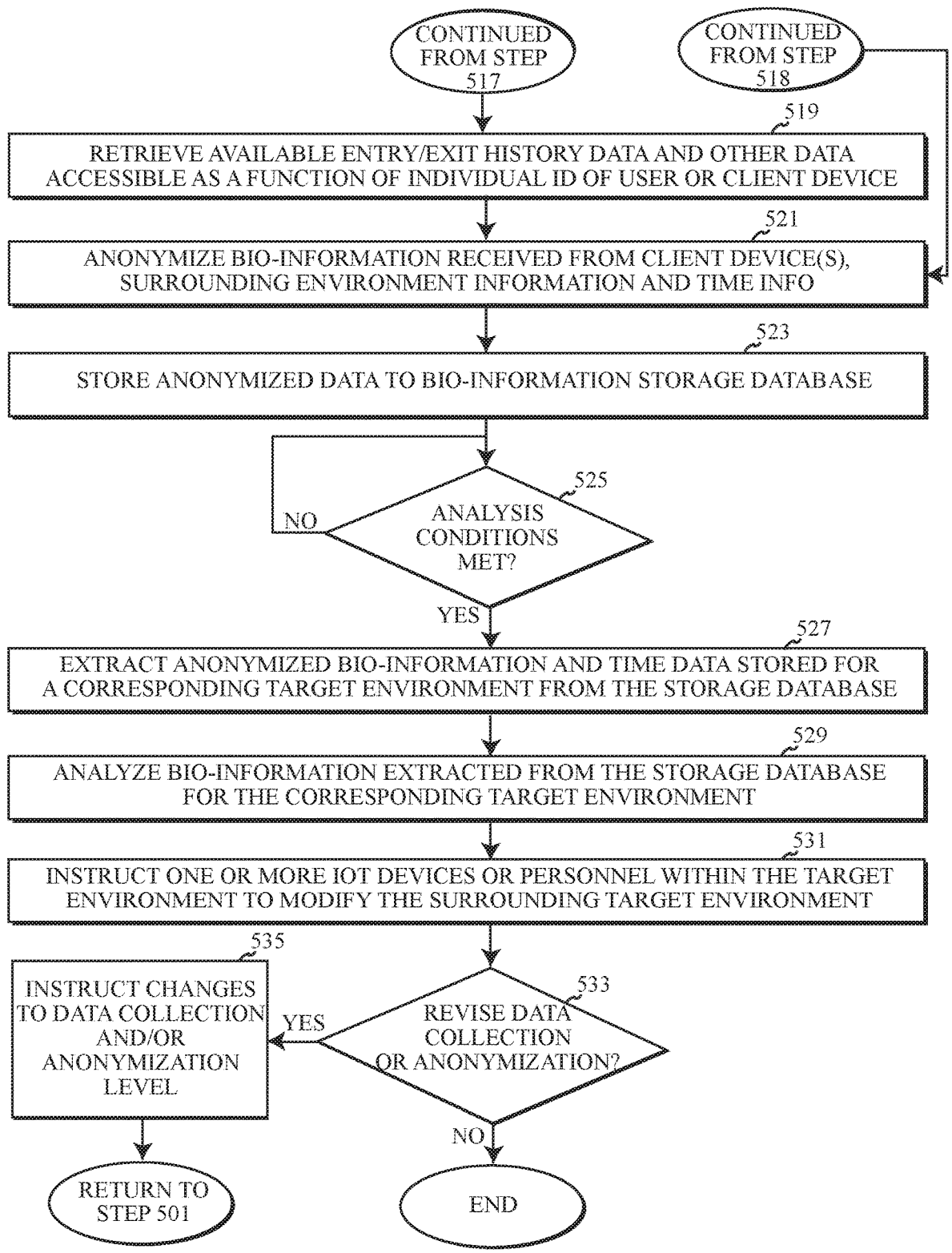

The drawing of FIG. 5a-5b represents an embodiment of an algorithm 500 performing a computer-implemented method for dynamically controlling and managing a physical environment using collected and anonymized biological information, and positional information such as location data historical data associated with one or more individual IDs. The algorithm 500, as shown and described by FIG. 5a-5b, may use one or more computer systems, defined generically by data processing system 100 of FIG. 1, and more specifically by the embodiments of specialized data processing systems of computing environments 200, 260, 300, depicted in FIGS. 2a-4 and as described herein. A person skilled in the art should recognize that the steps of the algorithm 500 described in FIG. 5a-5b may be performed in a different order than presented. The algorithm 500 may not necessarily require all the steps described herein to be performed. Rather, some embodiments of algorithm 500 may alter the methods by performing a subset of steps using one or more of the steps discussed below.

Embodiments of the algorithm 500 may begin at step 501. In step 501, a data collection server 210 may instruct or request one or more client devices 201 within a targeted physical environment 202 to perform data collection activities in accordance with one or more data collection conditions set by the data collection server 210. The server API 230 may transmit the data collection request or instructions to the client device 201. Embodiments of the client device 201 may display the data collection request to the user via application interface 203 and may further allow for the user to input acceptance of the data collection conditions, including acceptance of the anonymization level of the data being collection by the data collection server 210.

In step 503 of the algorithm 500, a determination may be made whether or not the data collection conditions are accepted by the user based on the user's input into the application interface 203 of client device 201. If, in step 503, the determination is made that the collection conditions are not accepted by a client device 201, the client device 201 rejects the data collection attempt by the data collection server 210. The algorithm 500 may return to step 501 and transmit the request to collected data to one or more client devices 201 positioned within a targeted physical environment 202. Conversely, if in step 503, the collection conditions of the data collection request are accepted, the algorithm may proceed to step 511. In step 511, the client device 201 may collect and prepare for transmission one or more requested data types. For example, client device 201 may identify data applicable to the data collection request that may be stored by the bio data module 205, position module 209 and/or one or more individual IDs of the client device 201 and/or users of the client device 201. Embodiments of the client device 201 may anonymized the requested data via the anonymization module 213 before transmitting the requested data to the data collection server 210 and/or one or more nearby client device's positioned within the physical environment 202. The recipient client device 201 or data collection server 210 may receive the requested data, including bio-information, individual ID, location data and time data. In embodiments where the requested data is being transmitted from client device 201 to client device 201, upon the requisite amount of data being collected, per the conditions of the data collection request, the collected data may be transmitted to the data collection gateway 212.

In step 513, the recipient data collection server 210 and more specifically, the data collection gateway 212 managing the data collection from the client devices 201, may deploy the environment retrieval module 214 to identify one or more attributes of the physical environment 202 that may be surrounding the client devices 201 providing the collected data. The ascertainment of the physical environment 202 may be based upon location data and/or individual IDs provided by the client devices during the data collection. Embodiments of the environment retrieval module 214 may query one or more data sources for additional information that may be ascertained based upon the provided location data and/or individual IDs. In the exemplary embodiment, the environment retrieval module 214 may query entry/exit history 227 repository and/or a mapping data repository 229 for additional physical environmental information.

Based on the query performed in step 513 by the environment retrieval module 214, in step 515 a determination is made whether environment information is available in one or more data sources, such as the mapping data repository 229, that may be associated with the location data received from the client devices 201. If, in step 515 a determination is made that environment information is available within the mapping data repository 229, the algorithm 500 may proceed to step 517 and retrieve the available information further detailing the physical environment 202 associated with the location data from the mapping data repository 229 and proceed to step 518. Likewise, if a determination is made in step 515 that additional information detailing the physical environment 202 is not available within other data sources such as the mapping data repository 229, the algorithm may proceed to step 518 and further determine whether entry/exit data is available for the individual ID's received from one or more client devices 201. If one or more individual IDs are associated information available in one or more data sources, such as entry/exit history 227, the algorithm 500 may proceed to step 519, otherwise, if individual IDs are not associated with additional information maintained by one or more data sources, the algorithm 500 may proceed to step 521.

In step 519 of algorithm 500, the environmental retrieval module 214 may retrieve the entry/exit history data from the entry/exit history 227 repository as well as other available data sources that may provide additional data associated with the individual IDs associated with a user and/or client device 201. In step 521, the data collected from the client devices 201 and additional data collected about the physical environment in steps 515-519 may be anonymized by the anonymization module 216 in accordance with the anonymization level of the collection conditions and/or a statistical processing scheme prescribed by the data collection request. In step 523, the anonymized data is stored by a data storage engine 218 to a repository, database or other data storage structure for subsequent extraction and analysis by a data analysis server 220.

In step 525, a determination is made by an information retrieval module 226 of the data analysis server 220 whether or not analysis conditions are met for analyzing collected data associated with a target physical environment 202. In the exemplary embodiment, the conditions for analyzing the anonymized data associated with the target physical environment 202 may be based on timing (periodical, random, irregular, etc.). If the conditions are not met for analyzing anonymized data of a target physical environment 202, the analysis module 224 may continue to wait until conditions are met for performing an analysis. Conversely, when conditions are met for analyzing the collected anonymized data for a targeted physical environment 202, the algorithm 500 may proceed to step 527 wherein the information retrieval module 226 may extract anonymized bio-information, location data, mapping data, entry/exit data, individual IDs, time data and other data from the bio-information storage database 231 and/or other data storage structures that may be accessible to the data analysis server 220.

In step 529, the data extracted by the information retrieval module 226 in step 527 may be analyzed by the analysis module 224 of the data analysis server 220. Embodiments of the analysis module 224 may draw conclusions about the physical environment 202, identify one or more recommendations, modifications or alternations to the physical environment 202 to implement within the physical environment and forward the recommendations, modifications, or alterations to the environment 202 as instructions for implementation to the environmental control module 222. In step 531 of the algorithm 500, the environmental control module 222 may implement the recommendations or modifications to the physical environment. For example, wherein the modification or alteration to the physical environment is performed by one or more IoT device 217 positioned within the physical environment 202, the environmental control module 222 may instruct one or more IoT devices 217 of an IoT network, and/or individual or personnel within a target environment to modify the surrounding physical environment 202. For example, by changing one or more settings of one or more IoT devices 217 positioned within the targeted physical environment 202.

In some embodiments of algorithm 500, the algorithm 500 may include step 533 which may determine whether or not the data analysis server 220 submits instructions or recommendations to revise data collection conditions and/or the anonymization level prescribed by the data collection request. If no revisions or recommendations for revising the data collection request are made, the algorithm 500 may be complete. However, if a change to the data collection conditions and/or the anonymization level of the data being collected, the algorithm 500 may proceed to step 535, wherein the data analysis server may instruct or recommend one or more changes to the data collection conditions or anonymization level and the algorithm 500 may return to step 501 to transmit a new data collection request that has been modified with the conditions and/or anonymization level prescribed or recommended by the data analysis server 220.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   collecting, client data from a plurality of client devices, the client data comprising biological data, location data, individual identification data, and time data;
   retrieving historical data collected at entry and exit locations, the historical data including entry and exit data associated with user identification data and corresponding times of entry and exit;
   identifying a set of surrounding physical environments in which the plurality of client devices are located as a function of the collected client data, available map data, and the retrieved historical data, the identified surrounding physical environments corresponding to a particular time period according to the time data;
   converting, by a processor, the collected client data into anonymous data including the identified surrounding physical environments;
   periodically extracting from the anonymous data a target portion of data, the target portion associated with a specified surrounding physical environment of the identified surrounding physical environments;
   analyzing the extracted target portion of the anonymous data to determine if a modification to an environmental control is needed; and
   as a function of the analysis, applying, the modification to the environmental control of the specified surrounding physical environment, the modification to the environmental control employing an action that implements a physical change that physically alters the specified surrounding physical environment.

2. The computer-implemented method of claim 1, wherein the modification to the environmental control of the specified surrounding physical environment comprises adjusting one or more settings of an internet-of-things (IoT) device positioned within the specified surrounding physical environment.

3. The computer-implemented method of claim 1, further comprising:
   instructing a client device from the plurality of client devices to anonymize the biological data, the location data, and an individual ID stored within the client device into anonymized data;
   instructing the client device to transmit the anonymized data stored by the client device with additional client devices in a sequence of client devices positioned within the set of surrounding physical environments; and
   upon collecting a predetermined amount of anonymized biological data, the location data, or the individual IDs from the client device and the additional client devices within a sequence of client devices, receiving all of the anonymized data collected from the client devices within the sequence of client devices from a representative client device determined at a point in time whereupon the predetermined amount of the anonymized biological data, the location data, or the individual IDs is collected.

4. The computer-implemented method of claim 3, further comprising:
   transmitting a query ID to the client device;
   instructing the client device to transmit the query ID and values of the anonymized data to a second client device in the sequence of client devices, wherein the second client device cannot determine whether the values of the anonymized data are values of the client device;
   instructing the second client device to transmit the query ID and a larger value of either the values of the anonymized data received from the first client device or anonymized data values stored by the second client device, to a third client device; and
   upon the client device receiving the query ID a second time, instructing the client device to transmit a current set of the anonymized data received with the query ID the second time to a data collection server.

5. The computer-implemented method of claim 3, further comprising:
   transmitting a data set comprising at least one dummy data value and a total number of data values to the client device;
   instructing the client device to modify the data set and transmit the modified data set to receiving client devices in the sequence of client devices, wherein the modified data set includes a sum of biological data values comprising a biological data value stored by the client device plus the at least one dummy data value, and adding at least one to the total number of data values, wherein receiving client devices in the sequence of client devices further modifies the modified data set by adding a biological data value stored by the receiving client device to the sum of biological values received and adding at least one to the total number of data values and transmits the modified data set a next client device in the sequence of client devices; and
   computing, an average biological data value, wherein computing the average biological data value comprises calculating $$\frac{\text{(the sum of biological data values in the modified data set} - \text{the at least one dummy data value)}}{\text{(the total number of data values in the sum of biological data values} - \text{a total number of dummy data values)}}.$$

6. The computer-implemented method of claim 3, further comprising:
transmitting dummy records of comprising a combination of biological data, the position data and the individual ID to the client device, wherein anonymizing the biological data, the position data and the individual ID stored within the client device into the anonymized data is performed by selecting the dummy records of the combination to inject k-anonymity into the biological data, the position data and the individual ID.

7. The computer-implemented method of claim 1, wherein the converting of the client data into the anonymous data is performed according to an anonymization level established by a set of collection conditions defined prior to collecting the client data.

8. The computer-implemented method of claim 7, further comprising:
transmitting an instruction to change the set of collection conditions, revising the anonymization level for converting the client data into the anonymous data.

9. A computer system comprising:
a processor; and
a computer-readable storage media coupled to the processor, wherein the computer-readable storage media contains program instructions executing a computer-implemented method comprising:
collecting client data from a plurality of client devices, the client data comprising biological data, location data, individual identification data, and time data;
retrieving historical data collected at entry and exit locations, the historical data including entry and exit data associated with user identification data and corresponding times of entry and exit;
identifying a set of surrounding physical environments in which the plurality of client devices are located, as a function of the collected client data, available map data, and the retrieved historical data, the identified surrounding physical environments corresponding to a particular time period according to the time data;
converting, by the processor, the collected client data into anonymous data including the identified surrounding physical environments;
periodically extracting from the anonymous data, a target portion of data, the target portion associated with a specified surrounding physical environment of the identified surrounding physical environments;
analyzing, the extracted target portion of the anonymous data to determine if a modification to an environmental control is needed; and
as a function of the analysis, applying the modification to the environmental control of the specified surrounding physical environment, the modification to the environmental control employing an action that implements a physical change that physically alters the specified surrounding physical environment.

10. The computer system of claim 9, further comprising:
one or more Internet-of-things (IoT) devices positioned within the set of surrounding physical environments, placed in communication with the processor via a computer network, wherein the modification to the environment control within the specified surrounding physical environment comprises adjusting one or more settings of the one or more IoT devices.

11. The computer system of claim 10, wherein adjusting one or more settings of the IoT device positioned within the specified surrounding physical environment physically alters the surrounding physical environment.

12. The computer system of claim 9, further comprising:
instructing a client device from the plurality of client devices to anonymize the biological data, the location data, and an individual ID stored within the client device into the anonymized data;
instructing the client device to transmit the anonymized data stored by the client device with additional client devices in a sequence of client devices positioned within the set of surrounding physical environments; and
upon collecting a predetermined amount of anonymized biological data, the location data, or the individual IDs from the client device and the additional client devices within the sequence of client devices, receiving all of the anonymized data collected from the client devices within the sequence of client devices from a representative client device determined at a point in time whereupon the predetermined amount of the anonymized biological data, the location data, or the individual IDs is collected.

13. The computer system of claim 12, further comprising:
transmitting a query ID to the client device;
instructing the client device to transmit the query ID and values of the anonymized data to a second client device in the sequence of client devices, wherein the second client device cannot determine whether the values of the anonymized data are values of the client device;
instructing the second client device to transmit the query ID and a larger value of either the values of the anonymized data received from the first client device or anonymized data values stored by the second client device, to a third client device; and
upon the client device receiving the query ID a second time, instructing the client device to transmit a current set of the anonymized data received with the query ID the second time to a data collection server.

14. The computer program product of claim 12, further comprising:
transmitting dummy records of comprising a combination of biological data, the position data and the individual ID to the client device, wherein anonymizing the biological data, the position data and the individual ID stored within the client device into the anonymized data is performed by selecting the dummy records of the combination to inject k-anonymity into the biological data, the position data and the individual ID.

15. A computer program product comprising a computer-readable storage medium having a set of instructions stored therein which, when executed by a processor, causes the processor to perform a method comprising:
collecting, client data from a plurality of client devices, the client data comprising biological data, location data, individual identification data, and time data;
retrieving historical data collected at entry and exit locations, the historical data including entry and exit data associated with user identification data and corresponding times of entry and exit;
identifying a set of surrounding physical environments in which the plurality of client devices are located, as a function of the collected client data, available map data, and the retrieved historical data, the identified surrounding physical environments corresponding to a particular time period according to the time data;
converting, by the processor, the collected client data into anonymous data including the identified surrounding physical environments;

periodically extracting from the anonymous data, a target portion of data, the target portion associated with a specified surrounding physical environment of the identified surrounding physical environments;

analyzing the extracted target portion of the anonymous data to determine if a modification to an environmental control is needed; and as a function of the analysis, applying the modification to the environmental control of the specified surrounding physical environment, the modification to the environmental control employing an action that implements a physical change that physically alters the specified surrounding physical environment.

16. The computer program product of claim 15, wherein the modification to the environmental control of the specified surrounding physical environment comprises adjusting one or more settings of an internet-of-things (IoT) device positioned within the specified surrounding physical environment.

17. The computer program product of claim 16, wherein adjusting one or more settings of the IoT device positioned within the specified surrounding physical environment physically alters the surrounding physical environment.

18. The computer program product of claim 15, the set of instructions, when executed by the processor, further causing the processor to perform a method comprising:

instructing a client device from the plurality of client devices to anonymize the biological data, the location data, and an individual ID stored within the client device into the anonymized data;

instructing the client device to transmit the anonymized data stored by the client device with additional client devices in a sequence of client devices positioned within the set of surrounding physical environments; and upon collecting a predetermined amount of anonymized biological data, the location data, or the individual IDs from the client device and the additional client devices within the sequence of client devices, receiving all of the anonymized data collected from the client devices within the sequence of client devices from a representative client device determined at a point in time whereupon the predetermined amount of the anonymized biological data, the location data, or the individual IDs is collected.

19. The computer program product of claim 18, the set of instructions, when executed by the processor, further causing the processor to perform a method comprising:

transmitting a query ID to the client device;

instructing the client device to transmit the query ID and values of the anonymized data to a second client device in the sequence of client devices, wherein the second client device cannot determine whether the values of the anonymized data are values of the client device;

instructing the second client device to transmit the query ID and a larger value of either the values of the anonymized data received from the first client device or anonymized data values stored by the second client device, to a third client device; and upon the client device receiving the query ID a second time, instructing the client device to transmit a current set of the anonymized data received with the query ID the second time to a data collection server.

* * * * *